United States Patent
McKee et al.

(10) Patent No.: US 11,147,280 B2
(45) Date of Patent: Oct. 19, 2021

(54) EMULSIONS

(71) Applicant: Givaudan, S.A., Vernier (CH)

(72) Inventors: Mary Amanda McKee, Cincinnati, OH (US); Stephen Fenimore, Cincinnati, OH (US); Kim Par Toh, Singapore (SG)

(73) Assignee: Givaudan SA, Vernier (CH)

(*) Notice: Subject to any disclaimer, the term of this patent is extended or adjusted under 35 U.S.C. 154(b) by 485 days.

(21) Appl. No.: 15/554,172

(22) PCT Filed: Mar. 10, 2016

(86) PCT No.: PCT/EP2016/055116
§ 371 (c)(1),
(2) Date: Aug. 28, 2017

(87) PCT Pub. No.: WO2016/142463
PCT Pub. Date: Sep. 15, 2016

(65) Prior Publication Data
US 2018/0077942 A1 Mar. 22, 2018

Related U.S. Application Data

(60) Provisional application No. 62/132,110, filed on Mar. 12, 2015, provisional application No. 62/262,053, filed on Dec. 2, 2015.

(51) Int. Cl.
| | |
|---|---|
| *A23L 27/00* | (2016.01) |
| *A21D 13/40* | (2017.01) |
| *A23D 7/01* | (2006.01) |
| *A23D 7/005* | (2006.01) |
| *A23L 27/26* | (2016.01) |
| *A23L 27/20* | (2016.01) |

(52) U.S. Cl.
CPC ........... *A21D 13/40* (2017.01); *A23D 7/0053* (2013.01); *A23D 7/011* (2013.01); *A23L 27/20* (2016.08); *A23L 27/26* (2016.08); *A23L 27/80* (2016.08); *A23V 2002/00* (2013.01)

(58) Field of Classification Search
USPC ........................................ 426/601, 602, 604
See application file for complete search history.

(56) References Cited

U.S. PATENT DOCUMENTS

| | | | |
|---|---|---|---|
| 4,992,284 | A | 2/1991 | Kunz |
| 6,136,364 | A | 10/2000 | Merchant et al. |
| 8,475,865 | B2 | 7/2013 | Elleman et al. |
| 2004/0029750 | A1 | 2/2004 | Schudel et al. |
| 2004/0043043 | A1 | 3/2004 | Schlyter et al. |
| 2008/0206426 | A1 | 8/2008 | Rousset et al. |
| 2008/0241335 | A1 | 10/2008 | Rey et al. |
| 2011/0091636 | A1 | 4/2011 | Elleman et al. |
| 2012/0053251 | A1 | 3/2012 | Ervin et al. |
| 2014/0100276 | A1 | 4/2014 | Orita et al. |

FOREIGN PATENT DOCUMENTS

| | | |
|---|---|---|
| CA | 835328 A | 2/1970 |
| EP | 0 815 743 A2 | 1/1998 |
| EP | 1 759 591 A1 | 3/2007 |
| JP | 2001-103919 A | 4/2001 |
| WO | WO 97/46117 | 12/1997 |
| WO | WO 2009/090416 A1 | 7/2009 |

OTHER PUBLICATIONS

PCT/EP2016/055116—International Search Report, dated May 18, 2016.
PCT/EP2016/055116—International Written Opinion, dated May 18, 2016.
GB1514806.7—Great Britain Search Report, dated Feb. 11, 2016.

*Primary Examiner* — Lien T Tran
(74) *Attorney, Agent, or Firm* — Curatolo Sidoti Co., LPA; Salvatore A. Sidoti; Floyd Trillis, III

(57) ABSTRACT

A topical flavor composition comprising at least one hydrophilic flavor compound and at least one lipophilic flavor compound, the flavor composition being a water-in-oil emulsion having a continuous non-aqueous phase and a disperse aqueous phase, the at least one lipophilic flavor compound being dissolved or dispersed in the continuous phase and the at least one hydrophilic flavor compound dissolved or dispersed in the disperse phase. The composition is useful for topical application to a wide variety of comestible products and allows highly versatile flavoring possibilities.

20 Claims, No Drawings

EMULSIONS

CROSS REFERENCE TO RELATED APPLICATIONS

This application is a national stage application of International Application No. PCT/EP2016/055116, filed 10 Mar. 2016, which claims priority from United States Provisional Patent Application Nos. 62/132,110 filed 12 Mar. 2015 & 62/262,053 filed 2 Dec. 2015, which applications are incorporated herein by reference.

This disclosure relates to flavor compositions for topical application to comestible products.

To achieve a desired flavor in a comestible product, especially one that has been manufactured, it is often necessary to add flavor compounds. There is a wide variety of these available to the flavorist, and they can be combined in myriad ways to produce a desired flavor, either to emulate a natural flavor, or to produce something completely unique.

While many flavors are added to the bulk of a comestible product, for example, mixed into dough, others are added topically to the product. This allows for greater versatility and variety—a basic product may be flavored in a variety of different ways, thus reducing costs. Topical flavors are typically solids. This restricts the possibilities of flavor addition, as they introduce complications to the application process. For example, they are often applied as slurries, and these not only can have stability problems, but also over time can cause blockages in the application systems.

In addition, flavor compounds have a large variety of chemical structures, meaning that their solubilities in aqueous and non-aqueous media will often differ widely. This can be a problem, as a flavorist will often want to combine flavor compounds, some of which are soluble in aqueous media, others that are soluble in non-aqueous media. The incompatibility of the two severely hinders the potential creativity of the flavorist, especially with regard to oils, which will be used as or incorporated into comestible products.

It has now been found that it is possible to supply for topical application to a comestible product both hydrophilic and lipophilic flavor compounds in a single package. There is therefore provided a topical flavor composition comprising at least one hydrophilic flavor compound and at least one lipophilic flavor compound, the flavor composition being a water-in-oil emulsion having a continuous non-aqueous phase and a disperse aqueous phase, the at least one lipophilic flavor compound being dissolved or dispersed in the continuous phase and the at least one hydrophilic flavor compound dissolved or dispersed in the disperse phase.

There is further provided a flavored comestible product, in which the flavor is at least partially provided by a topically-applied water-in-oil emulsion comprising at least one lipophilic flavor compound and at least one hydrophilic flavor compound, the at least one lipophilic flavor compound being dissolved or dispersed in the continuous phase and the at least one hydrophilic flavor compound dissolved or dispersed in the disperse phase.

There is further provided a method of providing flavor to a comestible product, comprising the topical addition thereto of a flavor composition comprising at least one hydrophilic flavor compound and at least one lipophilic flavor compound, the flavor composition being a water-in-oil emulsion having a continuous non-aqueous phase and a disperse aqueous phase, the at least one lipophilic flavor compound being dissolved or dispersed in the continuous phase and the at least one hydrophilic flavor compound dissolved or dispersed in the disperse phase.

The flavor composition hereinabove described is a water-in-oil (hereinafter "W/O") emulsion. This composition may provide the sole flavor compounds to the non-aqueous comestible liquid, or it may supplement flavor compounds present in the liquid itself. In a particular embodiment, the W/O emulsion provides all of the flavor compounds to the liquid.

Flavored W/O emulsions are known, for example, from United States published application No. 2014/0100276. However, disclosure of the use of such emulsions as topical applications, as opposed to spreads or fillings, is not known.

The compositions of this disclosure may be fluid or solid. "Fluid" includes both flowable liquids and viscous solid and semi-solid compositions such as pastes.

The continuous phase of the W/O emulsion comprises all of the oil-soluble flavour components. These components may comprise the entire oil phase, or there may also be present a solvent, the nature and quantity of which may be selected according to the normal practices of the art. Typical components of the non-aqueous (oil) phase include one or more flavor oils, examples of which include fatty acids, lactones, aldehydes, essential oils (especially of lower fold e.g. 1× versus 10×), and terpenes. By "aldehydes" is meant those suitable for flavoring purposes, typical non-limiting examples being acetaldehyde nat, Aldehyde-C12 (lauric) food grade, Aldehyde C-06 (hexanal), Aldehyde C-07, Aldehyde C-08 (octanal), Aldehyde C-08 Nat Fraction 40%, Aldehyde C-09 (nonanal), Aldehyde C-10 (decanal), Aldehyde C-16 (strawberry aldehyde), amyl cinnamic aldehyde, anisic aldehyde W/O Bha, benzaldehyde syn, butyraldehyde, cinnamic aldehyde, citronellal 85-90%, citronellal nat, cyclamen aldehyde, 2,4-decadienal, trans-2-decenal, furfural nat, 2,4-heptadienal, trans-2-heptenal, hydroxy citronellal ex, isobutyraldehyde, isovaleraldehyde, melonal (2,6-dimethyl-5-heptenal), methional, 2-methyl butyraldehyde, 5-methyl-2-phenyl-2-hexenal, myrtenal, 2-nonenal, trans-2, cis-6-nonadienal, trans-2-octenal, trans-2-pentenal, perillaldehyde, salicylic aldehyde, para-tolyl aldehyde extra, N-valeraldehyde, vanillin and veratraldehyde Specific examples of flavor oils include butryric acid, gamma-decalactone, decanal, orange oil, and limonene. In a particular embodiment, the continuous phase is an edible oil or fat that is solid or semi-solid at room temperature, which is heated until it is sufficiently fluid. A typical example is a partially-hydrogenated soy bean oil.

The disperse water phase comprises water, optionally also with co-solvents such as glycols, in which is dissolved or dispersed water-soluble or -dispersible flavor components. These include, but are not limited to, sugars, sweeteners such as *stevia* extracts, salt, organic flavor acids such as citric acid, biobases, MSG and yeast extracts. In particular embodiments, the aqueous phase may comprise from 0-60%, from 20-60% or about 50% by weight of flavor components.

It is important that the emulsion be stable. The principles of stabilization of W/O emulsions are well known to the art, and the skilled person will readily comprehend what is required in each case, or can determine what is needed by simple, non-inventive routine experimentation. Examples include the use of comestible surfactants, emulsifiers and thickeners. There is available to the art a considerable number of these, of different physical characteristics and capabilities, and the selection of a suitable material or combination is within the skill of the art. Typical emulsifying agents include lecithin and PGPR (polyglycerol polyricinoleate).

In a particular embodiment, PGPR is especially effective when the continuous phase is selected from a comestible oil that is liquid at ambient temperature. Typical examples of suitable oils include soybean oil, canola oil, or medium chain triglyceride (MCT).

The W/O emulsion may contain other components that are known to the art to be useful in such systems. These include preservatives such as sodium benzoate and potassium sorbate. A further component is thickener, which may be present in one or both of the aqueous and oil phases. This imparts physical stability to each phase, making the composition more robust over time and at wider temperature ranges, notably between 25° C. and 60° C. Standard thickeners such as xanthan gum, high-performance thickening starches such as Ultratex™, acetylated distarch adipate and acetylated di-starch phosphate may be used in art-recognised quantities for aqueous phases. In the case of oil phases, typical examples may include waxes, thickeners, and organogelators. Specific non-limiting examples include carnauba wax, candelilla wax, sugarcane wax, beeswax, 12-hydroxystearic acid, cetyl alcohol, palmitic acid, stearic acid, and mono- and/or diglycerides of fatty acids.

The flavor compounds of the flavor are separated into hydrophilic and lipophilic compounds and separately added to the appropriate phase, prior to the formation of the W/O emulsion. This is quite different from the usual practice of formulating a flavor and adding it as a single entity. It is well known that flavor compounds have a range of solubilities, varying from extremely lipophilic (such as terpenes) to extremely hydrophilic (such as acetone). There are compounds that are, to some degree, amphiphilic, i.e. having affinities for both phases. Such compounds can be incorporated into either phase.

Given that what would normally be a single formulation is split into two separate components, it might well be that the effect of the split will be to give an overall flavor effect somewhat different from that of a single formulation. However, it is within the capacity of the skilled flavorist to adjust for this and provide the desired effect.

The lipophilic and hydrophilic flavor compounds are dissolved or dispersed in the relevant phases by any convenient means known to the art. The two phases are then emulsified by any convenient means, for example, by high shear emulsification using, for example, a high pressure homogenizer or Silverson® mixer. It can be by continuous, single pass or batch production using single/multiple pass or recirculation mixing in a vessel.

In a typical method utilizing a room temperature solid or semi-solid oil or fat as continuous phase, the oil or fat is melted. Water-in-oil emulsifier and oil-soluble flavoring portions are then added. The warm (and still liquid) oil mixture is then added to a high shear mixer, to which the aqueous phase (water+water-soluble flavors) is added. The mixture is then mixed with high shear until a stable paste is formed. The paste is then allowed to cool to room temperature, at which point it is stable.

The flavor W/O emulsion is incorporated into the comestible product by topical application, that is, by the application of the composition to the comestible product, typically by spraying, dipping or coating.

The flavor compositions of the disclosure may be used in any comestible product in which the topical presence of both lipophilic and hydrophilic flavors is desired. Non-limiting examples include
spray-on or slurry-on snacks
frying oil for a) food service (fried chicken, French fries), b) snacks c) instant noodle dough
oil sachet for instant noodles
processed meat, e.g., canned ham
sauces and dressings.

The proportion of flavor composition used may vary widely, depending on the natures of the flavors, the flavor effect desired and the particular end-use of the comestible product. However, the selection of suitable proportion can be made in every case by the ordinary skill of the art.

The disclosure is further described with reference to the following non-limiting examples, which depict preferred embodiments. All parts are by weight.

EXAMPLE 1

Preparation of a Flavor Composition:
Aqueous Phase:

| Water | 43.9 parts |
| --- | --- |
| Flavor* | 11.0 |
| Potassium sorbate | 0.05 |
| Sodium benzoate | 0.05 |

*a water-soluble flavor consisting of a blend of desired commercially-available flavor ingredients. The nature of these ingredients may be changed according to the desired end-use Oil Phase:

| Partially hydrogenated soybean oil | 22.95 |
| --- | --- |
| Oil-soluble flavor** | 11.05 |
| Rice bran lecithin | 11.0 |

**an oil-soluble flavor consisting of a blend of desired commercially-available flavor ingredients.

The aqueous phase components were blended to form a solution. The oil phase components were separately blended at elevated temperature sufficient to melt the vegetable oil (between 40°-60° C.). The molten oil phase was added to a high shear mixer and mixing commenced. The aqueous phase was slowly added to this mixture while mixing and mixing was continued for at least 15 minutes after completion of aqueous phase addition.

The final product was a W/O emulsion that was easily removed from the container and exhibited paste-like properties when allowed to cool to ambient temperature.

EXAMPLE 2

Preparation of a Cheese-Flavored Flavor Composition:
Aqueous Phase:

| Water | 43.9 parts |
| --- | --- |
| Water-soluble cheese flavorings | 11 |
| Potassium sorbate | 0.05 |
| Sodium benzoate | 0.05 |

Oil Phase:

| Partially hydrogenated soybean oil | 23 parts |
| --- | --- |
| Liquid cheese flavoring | 11 |
| Rice bran lecithin | 11. |

The aqueous and oil phases were blended as described in Example 1. The final result was a stable, uniform emulsion with paste-like properties when allowed to cool to ambient temperature. This composition was added to 65° C. canola oil at 16.3% by weight, and the resulting mixture applied via brush to the outside surface of a pre-baked and pre-salted cracker at 7% wt.

This gave a cheese-flavored cracker with desirable flavor intensity and crispness.

EXAMPLE 3

Preparation of a Chorizo-Flavored Flavor Composition:

Aqueous Phase:

| Water | 27.4 parts |
| --- | --- |
| Water soluble flavorings | 27.5 |
| Potassium sorbate | 0.05 |
| Sodium benzoate | 0.05 |

Oil Phase:

| Medium chain triglyceride | 27.68 parts |
| --- | --- |
| Liquid chorizo flavoring | 13.33 |
| PGPR | 4. |

The aqueous and oil phases were blended as described in Example 1, except that elevated temperatures were not required to liquefy the medium chain triglyceride. The final result was a stable, uniform emulsion with liquid-like properties at ambient temperature. This composition was added to 65° C. canola oil at 26.1% by weight, and the resulting mixture applied via brush to the outside surface of a pre-baked, and pre-salted cracker at 7% wt.

This gave a chorizo-flavored cracker with desirable flavor intensity and crispness.

EXAMPLE 4

Preparation of a Pizza Flavor Composition:

Aqueous Phase

| Water | 27.4 parts |
| --- | --- |
| Water soluble flavorings | 27.5 |
| Potassium sorbate | 0.05 |
| Sodium benzoate | 0.05 |

Oil Phase:

| Palm oil | 27 parts |
| --- | --- |
| Palmitic acid | 5 |
| Liquid pizza flavoring | 12 |
| Sunflower lecithin | 1. |

The aqueous and oil phases were blended as described in Example 1. The final result was a stable, uniform emulsion with paste-like properties when allowed to cool to ambient temperature. This composition was added to 65° C. canola oil at 26.1% by weight, and the resulting mixture applied via brush to the outside surface of a pre-baked and pre-salted cracker at 7% wt.

This gave a pizza-flavored cracker with desirable flavor intensity and crispness.

EXAMPLE 5

Preparation of a Pizza Flavor Composition:
Aqueous Phase

| Water | 27.4 parts |
| --- | --- |
| Water soluble flavorings | 27.5 |
| Potassium sorbate | 0.05 |
| Sodium benzoate | 0.05 |

Oil Phase:

| Palm oil | 24 parts |
| --- | --- |
| Palmitic acid | 5 |
| Liquid pizza flavoring | 12 |
| Sorbitan monooleate | 4. |

The aqueous and oil phases were blended as described in Example 1. The final result was a stable, uniform emulsion with paste-like properties when allowed to cool to ambient temperature. This composition was added to 65° C. canola oil at 26.1% by weight, and the resulting mixture applied via brush to the outside surface of a pre-baked and pre-salted cracker at 7% wt.

This gave a pizza flavored cracker with desirable flavor intensity and crispness.

EXAMPLE 6

Preparation of a Pizza Flavor Composition:
Aqueous Phase

| Water | 27.4 parts |
| --- | --- |
| Water soluble flavorings | 27.5 |
| Potassium sorbate | 0.05 |
| Sodium benzoate | 0.05 |

Oil Phase:

| Sunflower oil | 28 parts |
| --- | --- |
| Candelilla wax | 1 |
| Liquid pizza flavoring | 12 |
| PGPR | 4. |

The aqueous phase was prepared by dissolving the ingredients in water. The oil phase was prepared first by dissolving the candelilla wax in the sunflower oil at 65° C. Next, flavoring and PGPR emulsifier were added to the molten oil phase. The molten oil phase was added to a high shear mixer and mixing commenced. The aqueous phase was slowly added to this mixture while mixing and mixing was continued for at least 10 minutes after completion of aqueous phase addition. The final result was a stable, uniform emulsion with liquid gel-like properties when allowed to cool to ambient temperature. This composition was added to 65° C. canola oil at 26.1% by weight, and the resulting mixture applied via brush to the outside surface of a pre-baked and pre-salted cracker at 7% wt.

This gave a pizza flavored cracker with desirable flavor intensity and crispness.

The invention claimed is:

1. A topical flavor composition comprising at least one hydrophilic flavor compound and at least one lipophilic flavor compound, the flavor composition being a water-inoil emulsion having a continuous non-aqueous phase and a disperse aqueous phase, the at least one lipophilic flavor compound dissolved or dispersed in the continuous phase and the at least one hydrophilic flavor compound dissolved or dispersed in the disperse phase.

2. The composition according to claim 1, in which the continuous phase of the emulsion is an edible oil or fat that is solid or semi-solid at room temperature, which is heated until it is sufficiently fluid.

3. The composition according to claim 1, in which the at least one lipophilic flavor compound in the continuous phase comprises at least one flavor oil selected from the group consisting of fatty acids, lactones, aldehydes, essential oils and terpenes.

4. The composition according to claim 3, in which the at least one flavor oil is selected from the group consisting of butyric acid, gamma-decalactone, decanal, orange oil, and limonene.

5. The composition according to claim 1, in which the disperse phase additionally comprises co-solvent.

6. The composition according to claim 1, in which the at least one hydrophilic flavor compound in the disperse phase comprises a water-soluble flavor component selected from the group consisting of sugars, sweeteners, salt, organic flavor acids, MSG and yeast extracts.

7. The composition according to claim 1, in which the disperse phase comprises from greater than 0 to 60% by weight of flavor components.

8. The composition according to claim 1, in which the composition comprises an emulsifying agent.

9. The composition according to claim 1, in which the emulsifier is polyglycerol polyricinoleate and the continuous phase is an oil that is liquid at ambient temperature.

10. The composition according to claim 1, in which at least one of the continuous phase and the disperse phase comprises thickener.

11. The composition according to claim 10, in which the thickener in the disperse phase is selected from xanthan gum and starches selected from the group consisting of high-performance thickening starches, acetylated distarch adipate and acetylated di-starch phosphate.

12. The composition according to claim 10, in which the thickener in the continuous phase is selected from waxes and organogelators.

13. A flavored comestible product, in which the flavor is at least partially provided by a topically-applied flavor composition according to claim 1.

14. A method of providing flavor to a comestible product, comprising the topical addition thereto of a flavor composition according to claim 1.

15. The composition according to claim 10, in which the thickener in the continuous phase is at least one compound selected from the group consisting of carnauba wax, candelilla wax, sugarcane wax, beeswax, 12-hydroxystearic acid, cetyl alcohol, palmitic acid, stearic acid, monoglycerides of fatty acids, and diglycerides of fatty acids.

16. The composition according to claim 9, in which the continuous phase is at least one of soybean oil, canola oil and medium chain triglyceride.

17. The composition according to claim 8, in which the composition comprises as emulsifying agent, at least one of lecithin and polyglycerol polyricinoleate.

18. The composition according to claim 2, in which the continuous phase of the emulsion is a partially-hydrogenated soy bean oil.

19. The composition according to claim 1, in which the disperse phase comprises from 20-60% by weight of flavor components.

20. The composition according to claim 1, in which either or both of the continuous or disperse phases comprises at least one amphiphilic compound.

* * * * *